Dec. 17, 1935.　　C. G. PFEIFFER ET AL　　2,024,596
TRUCK BODY
Filed Nov. 7, 1932　　7 Sheets-Sheet 1
FIG. I
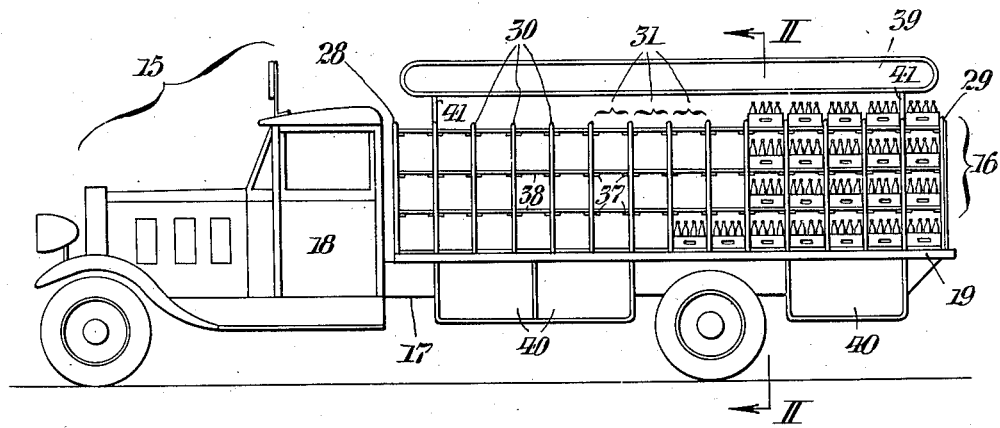
FIG. II
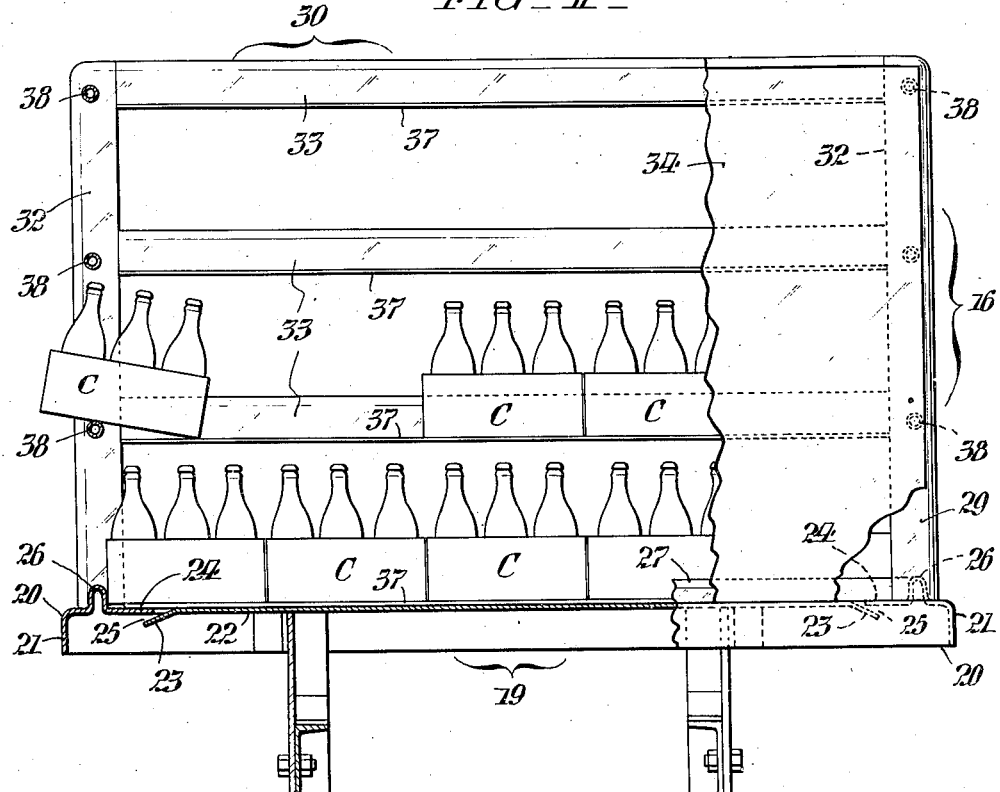
WITNESSES:
INVENTOR:
Charles G. Pfeiffer &
John G. Ogden.
BY
ATTORNEYS.

Dec. 17, 1935.   C. G. PFEIFFER ET AL   2,024,596
TRUCK BODY
Filed Nov. 7, 1932   7 Sheets-Sheet 2
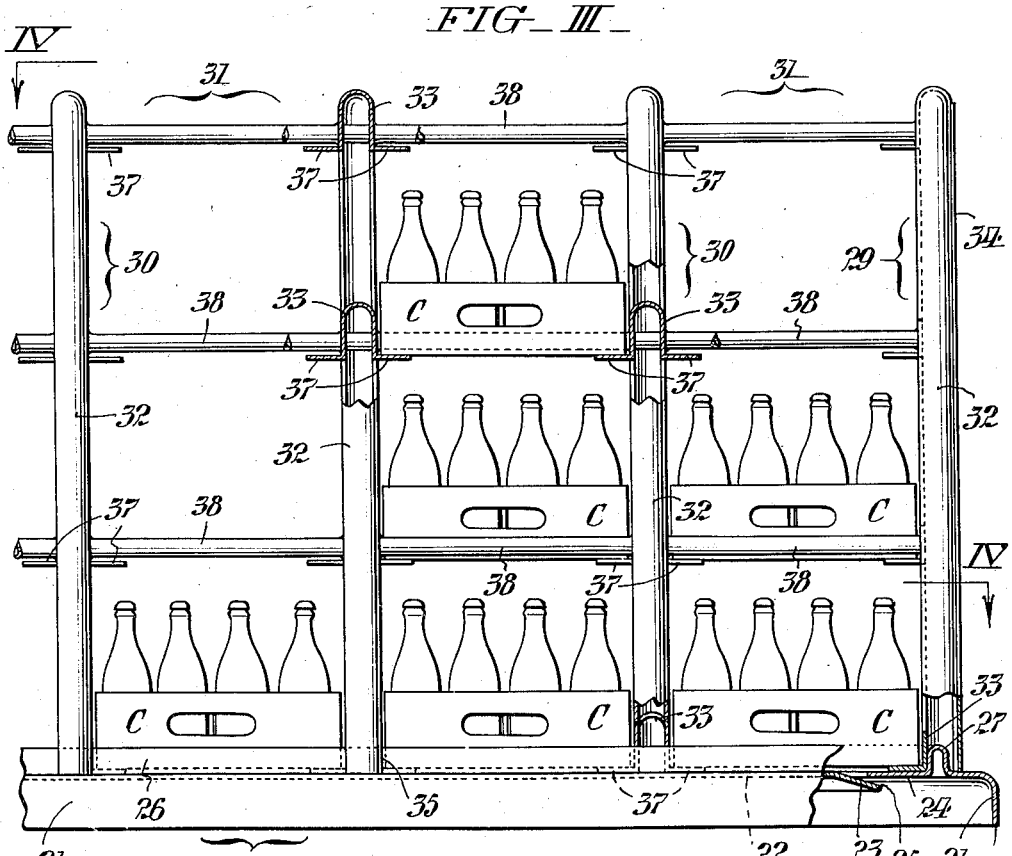
FIG. III
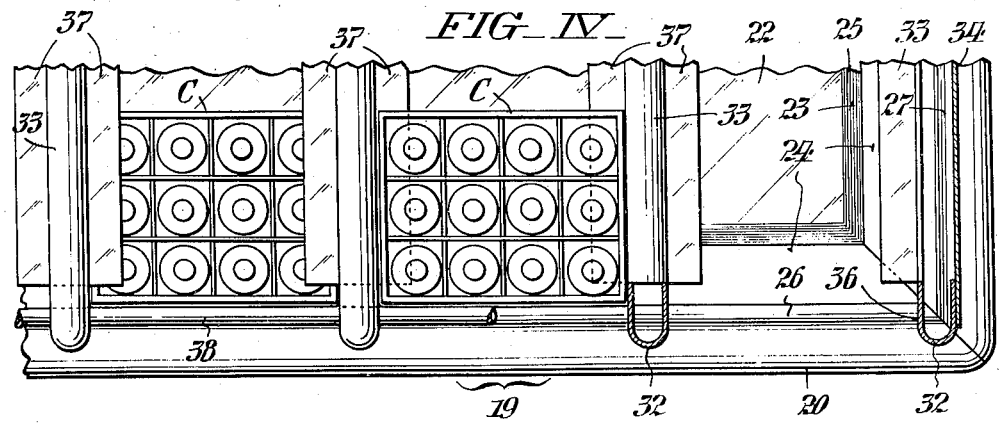
FIG. IV
WITNESSES:
INVENTOR:
Charles G. Pfeiffer &
John G. Ogden,
BY
ATTORNEYS.

Dec. 17, 1935.    C. G. PFEIFFER ET AL    2,024,596
TRUCK BODY
Filed Nov. 7, 1932    7 Sheets-Sheet 3
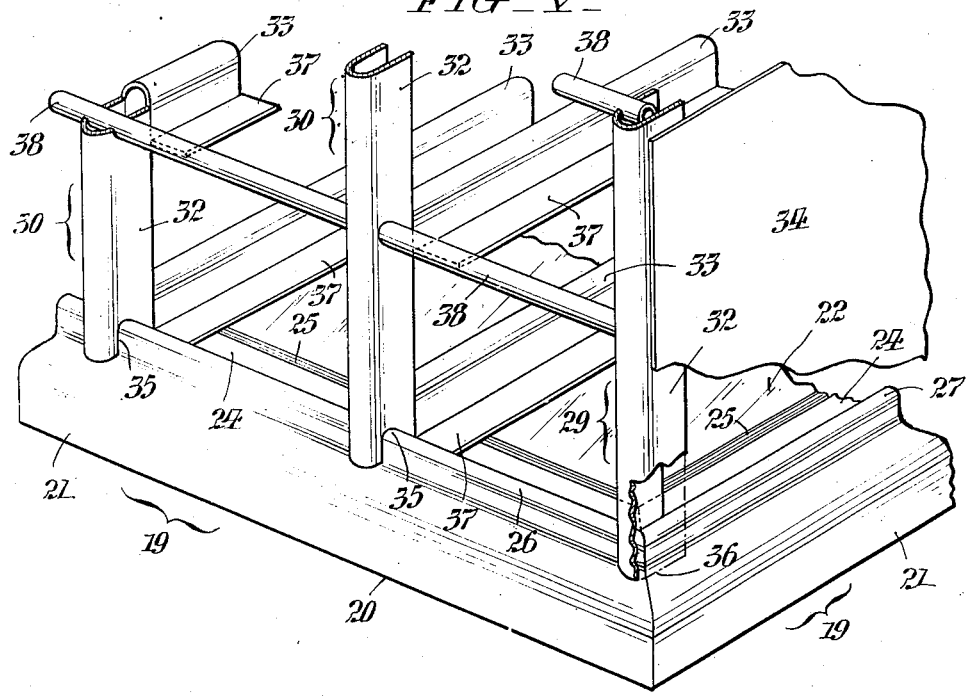
FIG_V_
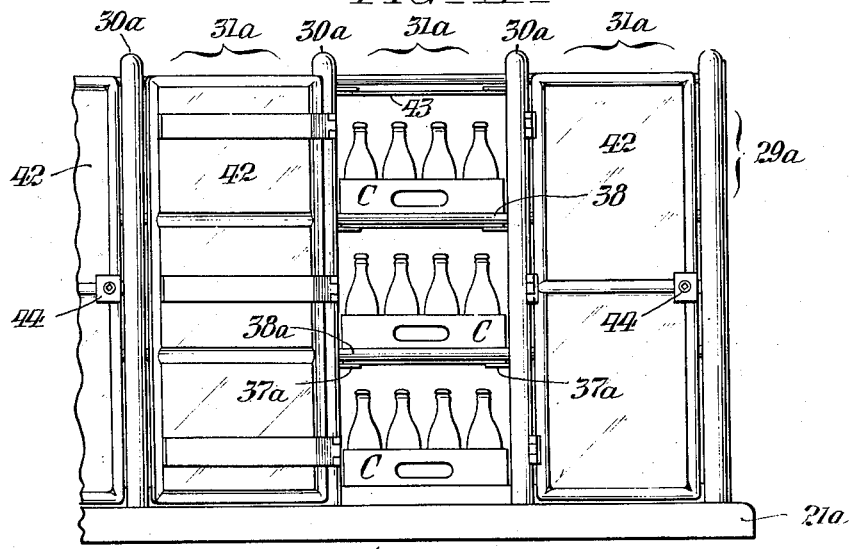
FIG_VI_
WITNESSES:
Hubert Fuchs
Woodrow Stevenson
INVENTOR:
Charles G. Pfeiffer &
John G. Ogden,
BY Fraley Paul
ATTORNEYS.

Dec. 17, 1935.  C. G. PFEIFFER ET AL  2,024,596
TRUCK BODY
Filed Nov. 7, 1932   7 Sheets-Sheet 4
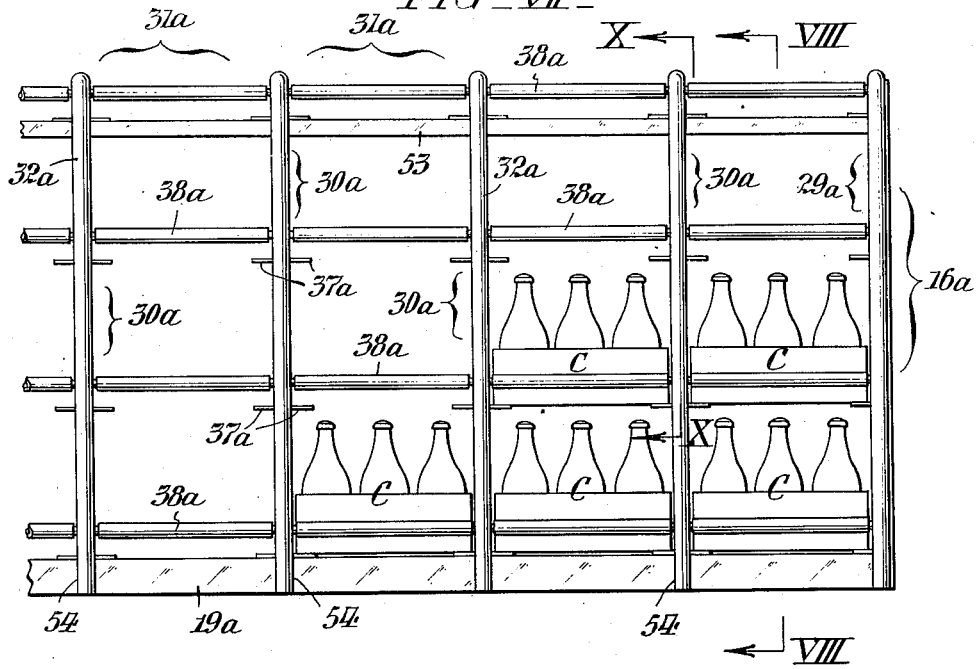
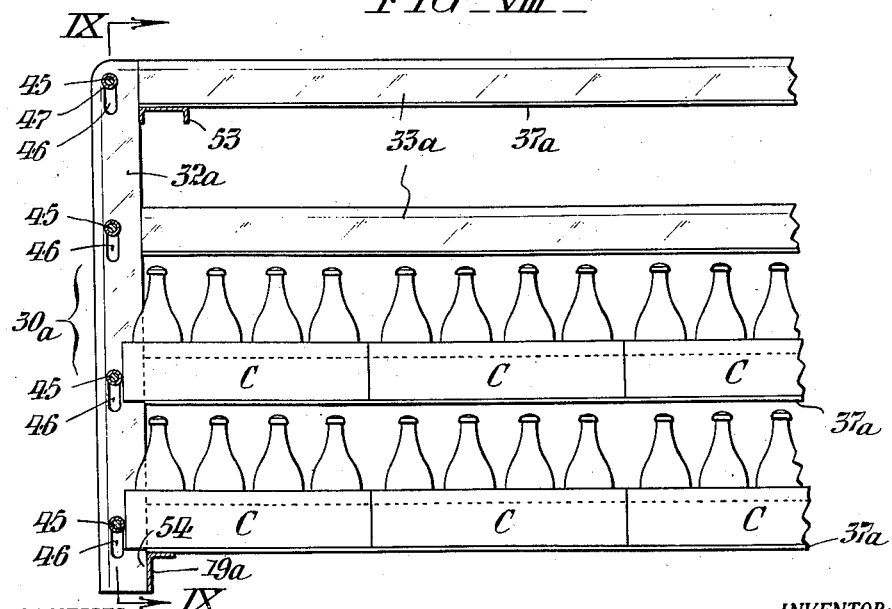

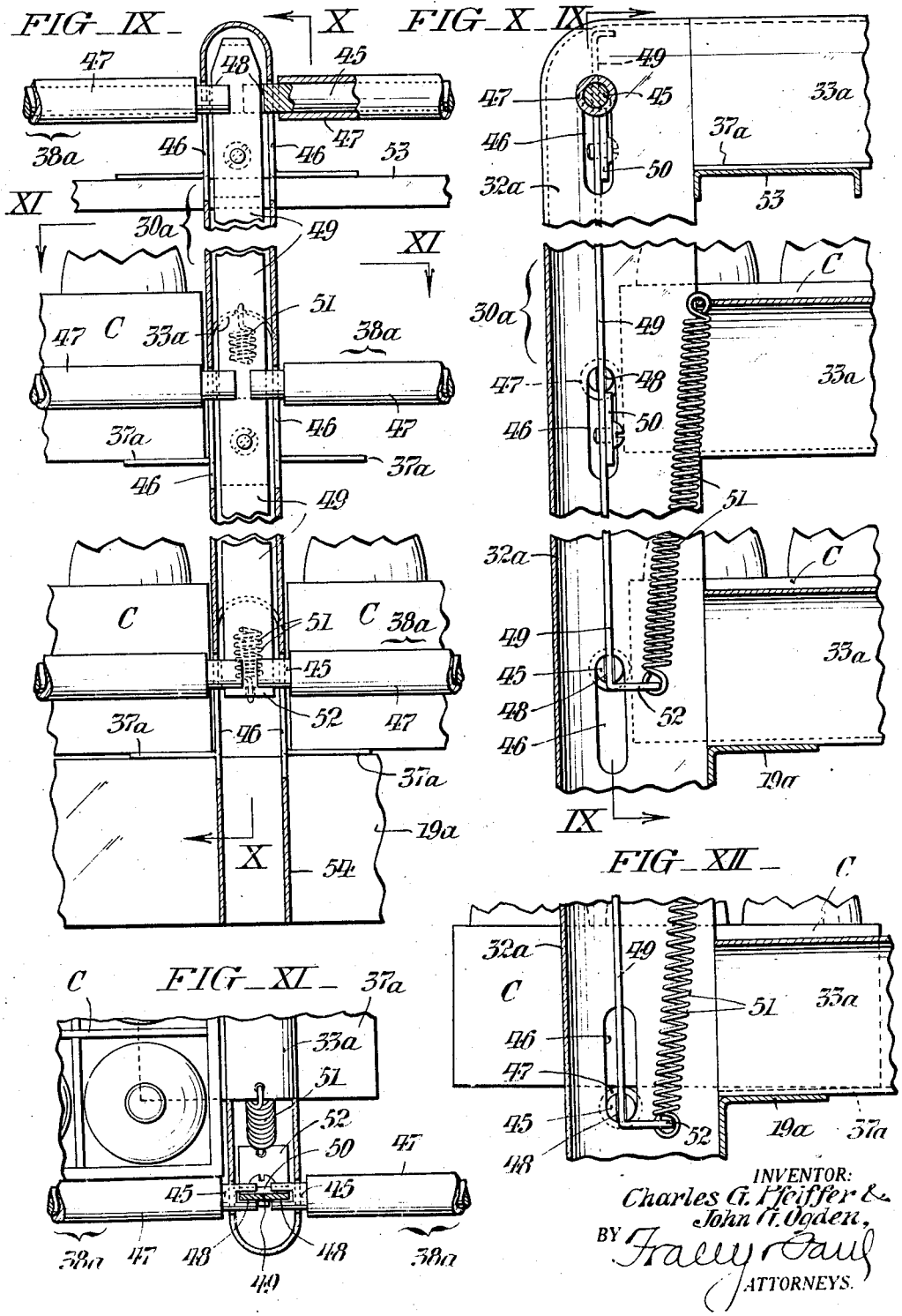

Dec. 17, 1935.  C. G. PFEIFFER ET AL  2,024,596
TRUCK BODY
Filed Nov. 7, 1932   7 Sheets-Sheet 6
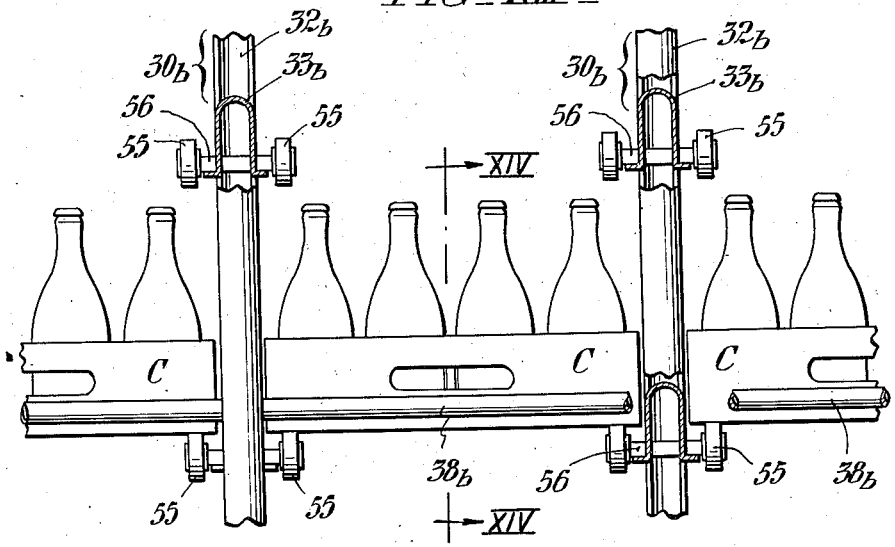
FIG. XIII
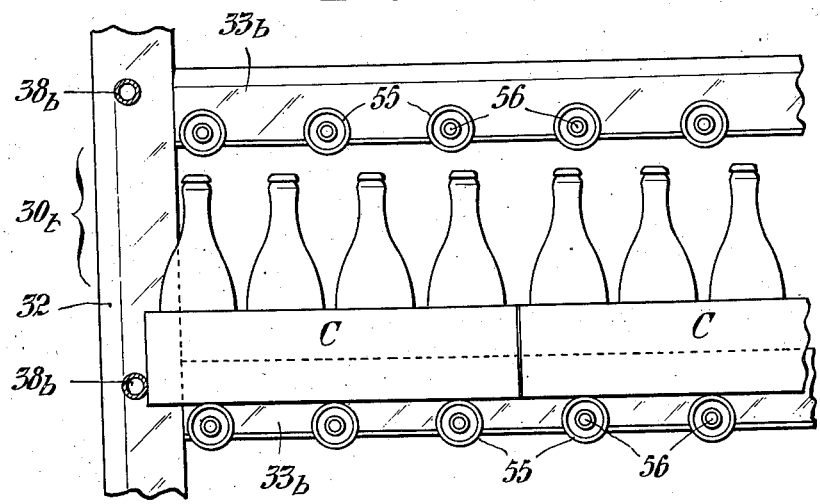
FIG. XIV
WITNESSES:
INVENTOR:
Charles G. Pfeiffer &
John G. Ogden,
BY
ATTORNEYS.

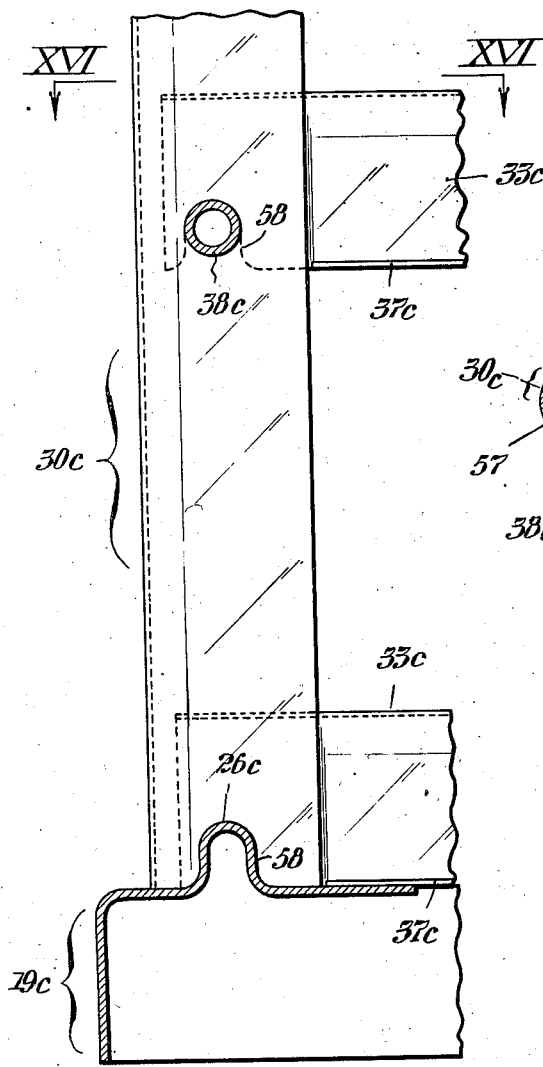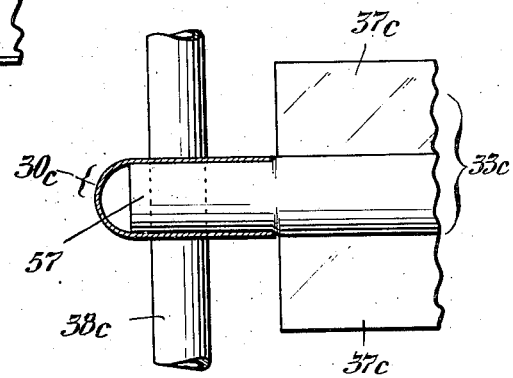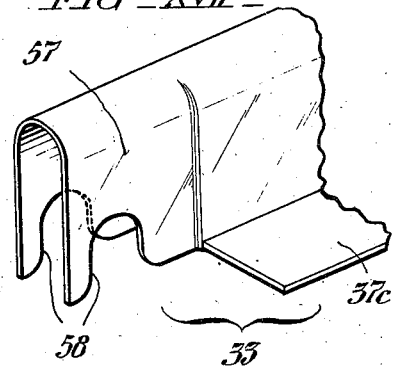

Patented Dec. 17, 1935

2,024,596

UNITED STATES PATENT OFFICE 2,024,596

TRUCK BODY

Charles G. Pfeiffer and John G. Ogden, Philadelphia, Pa., assignors to Specialty Engineering Company, Philadelphia, Pa., a corporation of Pennsylvania Application November 7, 1932, Serial No. 641,506

12 Claims. (Cl. 296—3)

This invention relates to bodies for wagons or auto trucks such as are used in the delivery of boxed or packaged merchandise, and it is concerned more particularly with truck bodies intended for the carriage of cases containing bottled beverages and the like.

In connection with truck bodies of the kind referred to it is an object of our invention to provide accommodation for a multiplicity of packages or cases such that, notwithstanding close compacting, the packages or cases are all visible from the sides of the vehicle for convenience of distinguishing between them without necessitating the removal of any of them, and, moreover, readily accessible for convenience of removing them individually incident to making deliveries.

A further object of our invention is to secure the advantages of combined lightness and rigidity through construction of a truck body suitable for the above indicated purposes, from pre-formed sheet metal parts interengaged in such manner as to form a rigid, open rack-like structure.

Our invention is also directed in part toward the provision of retaining stop means operative normally to hold the bottle cases against shifting in the body during travel of the vehicle, but capable of yielding to displacement to facilitate withdrawal and loading of the cases.

Other objects and attendant advantages of this invention will be manifest from the detailed description following of the attached drawings, wherein Fig. I is a side elevation of a delivery automobile incorporating our improved truck body in a form especially adapted for bottle cases.

Fig. II is a view of the truck body, partly in end elevation, and partly in section taken as indicated by the arrows II—II in Fig. I, and drawn to a larger scale.

Fig. III is a fragmentary side elevation of the body with portions thereof broken away and sectioned to better show important structural details.

Fig. IV is a fragmentary illustration, partly in plan, and partly in horizontal section viewed as indicated by the arrows IV—IV in Fig. III.

Fig. V is a fragmentary perspective view further illustrating important structural details of the body.

Fig. VI is a fragmentary side elevation corresponding to Fig. III and showing a modification of the truck body wherein the subdivisions of the truck body are individually fitted with closure doors.

Fig. VII is a fragmentary view corresponding to Fig. III and showing still another modification of our invention.

Fig. VIII is a fragmentary cross section of the modification of Fig. VII, taken as indicated by the arrows VIII—VIII in the latter figure.

Fig. IX is a fragmentary detail sectional view taken as indicated by the arrows IX—IX in Fig. VIII and drawn to a larger scale.

Fig. X is a fragmentary detail sectional view taken as indicated by the arrows X—X in Figs. VII and IX.

Fig. XI is a fragmentary plan sectional view taken as indicated by the arrows XI—XI in Fig. IX.

Fig. XII is a fragmentary detail sectional view corresponding to Fig. X, showing certain parts in changed positon.

Fig. XIII is a fragmentary view corresponding to Fig. III showing a further modification of our invention.

Fig. XIV is a section taken as indicated by the arrows XIV—XIV in Fig. XIII.

Fig. XV is a fragmentary cross sectional view corresponding to Fig. II showing still another modification of our invention.

Fig. XVI is a detail plan section taken as indicated by the arrows XVI—XVI in Fig. XV; and Fig. XVII is a fragmentary perspective view of one of the cross members of the form of truck body shown in Fig. XV.

In Fig. I of these illustrations, we have depicted, at 15, a delivery automobile of conventional design; and, at 16, a truck body for bottle cases, constructed in accordance with our invention, the same being mounted upon, and suitably secured to the chassis frame 17 of the vehicle rearward to the driver's cab 18. Referring to Figs. II–V, the body 16 comprises a base or floor 19 which consists of an open oblong frame 20 of angle section with a continuous depending perimetric stiffening flange 21; and a center plate 22 whereof the margins are bent downwardly as at 23 to underlap the inward flanges 24 of the frame 20, with consequent formation of protected intervals 25 through which spillage from broken bottles and rain water may drain, but which are impenetrable by mud splash from beneath. At 26, 27 the frame 20 has longitudinally and transversely extending upward offsets which jointly form a continuous peripheral ridge that lends additional strength and stiffness to the base 19.

The upper part of the body 16 includes front and rear end wall members 28, 29 and a number of transverse partitions 30. In the present instance, see Figs. I and III, these partitions 30 are equally spaced in respect to each other and the front and rear wall members 28, 29, and thus set apart, lengthwise of the body, a series of subdivisions or compartments 31 which are accessible from opposite sides of the vehicle, and each of which accommodates several transverse rows of bottle cases C in superposed relation. When required, the body may obviously be constructed with the partitions 30 unequally spaced to suit bottle cases of different sizes. From Figs. II and III it will be observed that the end wall members and partitions 28, 29 and 30 have side uprights 32 which are joined at uniformly spaced vertical intervals by cross bars 33, and that the partitions are left open, while the end wall members are closed in by plates 34. The side uprights 32 of the end wall members and partitions 28, 29 and 30 are fashioned to relatively flat U-shaped or hollow channel cross section from sheet metal, and have their lower ends notched as at 35, 36 in Fig. V to fit over the perimetric ridge 26, 27 of the base frame 19. The horizontals 33 of the partitions 30 are likewise formed from sheet metal to flat U-shaped or hollow channel section, but differ from the uprights 32 in that they have lateral ledge flanges 37 along both edges. In the case of the end wall members 28, 29 however, the horizontals 33 have ledge flanges 37 only at the in sides. As shown, the flanges 37 serve as slider-rails whereof corresponding pairs support the opposite bottom edges of the bottle cases C. It is to be particularly noted from Figs. III, IV and V that the uprights 32 of the end wall members and partitions 28, 29 and 30 are placed with their roundings outward, and the horizontals 32 with their roundings upward, thereby adding to the attractiveness and finish of the truck body.

Extending along opposite sides of the body are longitudinals 38 which are respectively disposed somewhat above the planes of the ledge flanges 37 of the end wall members and partition, see Figs. II and III, for capacity to function as retaining stops in cooperation with the end cases of the several transverse rows in each subdivision. The bottle cases are thus effectively prevented from shifting with preclusion of bottle breakage during travel of the vehicle. As shown, these longitudinals 38 are cut to length from piping, and extend continuously through the end wall members and partitions 28, 29 and 30. The various parts entering into the construction of the truck body may be secured together by bolting or riveting; but for the sake of greater rigidity and permanence, as well as for economy of manufacture, we prefer to weld them together at the regions of mutual contact.

By virtue of being constructed as a rack-like structure from sheet metal, the truck body of our invention is relatively light in weight yet amply strong to support a multiplicity of filled bottle cases C compactly arranged as described. The open construction of the body obviously makes it possible for the driver to readily distinguish between the cases which contain filled bottles and those which contain "empties" without entailing the removal of any of them even when the truck is fully loaded; and it also enables the driver to insert and remove the cases individually from opposite sides of the vehicle.

For the purpose of advertising we may supplement the body at the top or along opposite sides with sign plates of metal or wood such as shown respectively at 39 and 40 in Fig. I. The upper sign plate may be supported, for example, by brackets 41 that reach up from the endmost of the transverse partitions 30, and signs at the sides of the vehicle suitably suspended and braced from the base frame 19 of the truck body.

In instances where it is desired to protect the bottle cases from the weather, as well as prevent theft during transport or while the vehicle is unattended, we provide the subdivisions 31 of the truck body as shown in Fig. VI, with individual doors 42, and close in said subdivisions at the top by roof plates 43. The doors 42 we preferably fabricate from sheet metal with suitable edge and crosswise embossments 43a for stiffening, and secure them along one side edge to an end wall 28a, 29a or partition 30a (as the case may be) so as to close against an adjacent end wall or partition. Suitable locks such as conventionally indicated at 44 may be employed to secure the doors against unauthorized opening.

In the modification of our invention illustrated in Figs. VII-XII, the retaining stops 38a, instead of being fixed and common to all the subdivisions 31a of the truck body as in Figs. I-V, are individual to said subdivisions and downwardly displaceable to facilitate removal from, and loading of the bottle cases C onto the truck. In this modification, each retaining stop 38a comprises a rod 45 whereof the ends extend into the hollows of the uprights 32a of adjacent partitions 30a (or between an end wall and a partition) through vertical slots 46 in said uprights; and a section of tubing 47 which is revolvable about the rod 45 like a roller and confined between the adjacent partitions. As shown in Figs. IX and XI, the contiguous ends of the rods 45 of aligned retainer stops are clevised as at 48 for passage and guidance of a vertical slide bar 49 concealed within the hollow of the side upright 32a of the partition 30a. At one side this rod carries lug plates 50 to engage beneath and support the contiguous ends of aligned rods 45 of the several vertically arranged retaining stops 38a of neighboring subdivisions, 31a of the body. A helical tension spring 51, connected at one end to the laterally bent lower end 52 of the slide bar 49, and at the other end to one of the horizontals 33a of the partition 30a, yieldingly maintains the several retaining stops in the normal raised operative position, as illustrated in Fig. X to hold the bottle cases C against shifting. It is to be understood that the parts just described are duplicated in each end wall member and partition of the truck body. Due to the revised construction of the retaining stops 38a, it has been necessary in this modification to employ channel section longitudinals 53 to rigidly unite the end walls and partitions 28, 29 and 30 at the top of the body; and to prolong the side uprights of the partitions downwardly to lap the flanges 18a of the base frame as at 54 in Figs. VII and VIII.

To remove a bottle case from the truck body of Figs. VII-XII, the rear bottom edge of the case is lifted and rested on the corresponding retaining stops 38a which latter recedes downward under the weight, as in Fig. XII, whereupon the case is withdrawn by rolling it on the sheathing tube surrounding the rod. This operation is thus rendered very easy, and upon withdrawal of the bottle case, the retaining stop 38a is immediately raised to its normal position by the spring to which it is subject. In all other respects, the construction of the body in Figs. VII-XII is exactly the same as in Figs. I-V, and in order to avoid the necessity for repetitive description here, all the corresponding parts have been identified with the same reference numerals previously employed except that in each instance the letter "a" has been employed as a subscript.

Figs. XIII and XIV feature an alternative embodiment of our invention wherein the lateral flange projections 37b of the partitions 30b are fitted with rollers 55 to directly support the bottle cases C. As shown, the rollers 55 are rotatably supported on the projecting ends of shafts 56 passed through and secured, as by welding, in the cross members 33b of the partitions 30b. This arrangement is advantageous in that it minimizes friction as the cases C are slid into and out of the truck body.

In the alternative embodiment of our invention delineated in Figs. XV, XVI and XVII, the cross members or horizontals 33c of each partition 30c are swedged or otherwise reduced at the ends, as at 57, to fit into the hollows of the end uprights 37c. Also, as shown, the reduced ends 57 are formed with cut-outs or notches 58 to engage over the ridges 26c of the base frame 19c and over the tubular horizontals 38c. As in the previous instances, the parts are here preferably welded together at the regions of mutual contact into a unitary integral structure. With this arrangement, assembling is greatly facilitated and greater security had as a consequence of the interlock between the parts.

It is quite evident that the truck body of our invention lends itself to many uses other than for bottle cases which adaptation has been chosen for convenience of illustration herein. In other words, the structure may be variously modified as to dimensions and arrangement within the scope of the appended claims for the accommodation of packages or other articles of merchandise where ease of access for selection, insertion and removal is of importance in making deliveries.

Having thus described our invention, we claim:

1. A rack-like truck body for cases or packages, comprising a hollow section base formed from sheet metal with upwardly-displaced ridges along its side edges; and section partitions, likewise fashioned from sheet metal, setting apart a number of separately-accessible subdivisions in the body, said partitions having their lower edges crosswise notched to fit over the ridges of the base, and affording lateral slider-rail ledge flange projections at different levels for supporting rows of the cases or packages, one above another, in the subdivisions aforesaid of the body.

2. A rack-like truck body for cases or packages, comprising a hollow section base formed from sheet metal with upwardly-displaced ridges along its side edges; section partitions, likewise ashioned from sheet metal, setting apart a number of separately-accessible subdivisions in the body, said partitions having their lower edges crosswise notched to fit over the ridges of the base, and affording lateral slider-rail ledge flange projections at different levels for supporting rows of the cases or packages, one above another, in the subdivisions aforesaid of the body; and rods extending through and connecting the partitions crosswise of the ends of the subdivisions respectively at levels somewhat above the planes of the case or package supporting slider-rail ledge flange projections.

3. A rack-like truck body for cases or packages, comprising a hollow section base fashioned from sheet metal; partitions setting apart a number of separately accessible subdivisions in the body, said partitions being likewise formed from sheet metal with side uprights of U-section notched at their lower edges to fit over upwardly-displaced ridges along opposite side edges of the base aforesaid, and vertically-spaced cross members of U-section joining the side uprights and having lateral slider rail flange projections along their edges to support rows of bottle cases, one above another, in the subdivisions of the body; and connecting rods extending continuously through the uprights of the several partitions at levels somewhat above the planes of the case or package supporting slider rail flange projections aforesaid.

4. A truck body for cases or packages, having partitions setting apart separate subdivisions for the cases or packages; retaining stops to prevent shifting of the cases or packages during travel of the vehicle, in the form of rods extending between partitions; and means concealed within hollows of the partitions to support the rods at the ends with capacity for yielding to depression under the weight of the cases or packages incident to loading or unloading.

5. A truck body for cases or packages, having hollow partitions setting apart subdivisions each accommodating a number of cases or packages one above another; retaining stops to prevent shifting of the cases or packages during travel of the vehicle, in the form of rods with their opposite ends extending through vertical slots into the hollows of the partitions; and means within the hollows of the partitions to support the rods at the ends with capacity for yielding under the weight of the cases or packages during loading and unloading of the latter.

6. A truck body for cases or packages, having hollow partitions setting apart subdivisions each accommodating a number of cases or packages one above another; retaining stops to prevent shifting of the cases or packages during travel of the vehicle, in the form of rods with their opposite ends extending through vertical slots into the hollows of the partitions; a vertical slide concealed in the hollow of each partition having lugs to support the ends of aligned retaining rods; and a spring exerting an upward pull on the slide to normally hold the retaining rods raised with capacity for yielding to being individually depressed to facilitate loading and removal of the cases or packages.

7. A rack-like truck body for cases or packages, comprising a base with upstanding ridges along its side edges; partitions setting apart a number of separately accessible subdivisions in the body, said partitions being composed of channel section end uprights with notches at their bottoms to engage over the ridges of the base, and cross members with their ends notched at the bottom and extending into the hollows of the uprights, said cross members affording lateral slider rail ledge flanges for supporting the cases or packages, one above another, in the subdivisions of the body; and vertically spaced connecting rail horizontals extending through the end uprights of the partitions and engaged respectively by the notched ends of the cross members of said partitions.

8. A truck body for cases or packages, having hollow partitions setting apart subdivisions each accommodating a number of cases or packages one above another; retaining stops to prevent shifting of the cases or packages during travel of the vehicle, in the form of rods with their opposite ends extending through vertical slots into the hollows of the partitions; a vertical slide concealed in the hollow of each partition having lugs to support the ends of aligned retaining rods; a spring exerting an upward pull on the slide to normally hold the retaining rods raised with capacity for yielding to being individually depressed to facilitate loading and removal of the cases or packages; and roller sheathings surrounding the rods in the intervals between the partitions.

9. A rack-like truck body for cases or packages comprising a base structure, uprights upstanding from said base at intervals along its opposite sides, and vertically spaced cross members of channel or U section interconnecting said uprights and arranged with the channel sides or U legs upright and engaging, at their ends, with the sides of said uprights, said cross members being provided with lateral shoulders for supporting cases or packages in the spaces between said cross members.

10. A rack-like truck body for cases or packages comprising a base structure, uprights of channel section upstanding from said base at intervals along its opposite sides, and vertically spaced cross members of inverted channel or U-section arranged with the channel sides or U-legs upright and engaged at their ends in the hollows of said uprights, and interconnecting them, said cross members having the lower portions of their said upright sides or legs flanged outward to afford lateral shoulders for supporting cases or packages in the spaces between said cross members.

11. A rack-like truck body for cases or packages comprising a base structure; uprights upstanding from said base at intervals along its opposite sides; vertically spaced cross members having their ends laterally engaged with said uprights, and provided with lateral shoulders for supporting cases or packages in the spaces between said cross members; and longitudinal rails extending through and interconnecting said uprights and the ends of the associated cross members, and spacing apart the adjacent uprights and the associated cross members.

12. A rack-like truck body for cases or packages comprising a base structure; uprights upstanding from said base at intervals along its opposite sides; vertically spaced cross members having their ends laterally engaged with said uprights, and provided with lateral shoulders for supporting cases or packages in the spaces between said cross members; and longitudinal side rails extending through said uprights and the ends of the associated cross members, above the levels of their aforesaid shoulders, and serving as side stops for the cases or packages supported by the latter.

CHARLES G. PFEIFFER.
JOHN G. OGDEN.